(12) United States Patent
Zhao et al.

(10) Patent No.: US 8,954,412 B1
(45) Date of Patent: Feb. 10, 2015

(54) CORROBORATING FACTS IN ELECTRONIC DOCUMENTS

(75) Inventors: Shubin Zhao, Jersey City, NJ (US); Krzysztof Czuba, New York, NY (US)

(73) Assignee: Google Inc., Mountain View, CA (US)

(*) Notice: Subject to any disclaimer, the term of this patent is extended or adjusted under 35 U.S.C. 154(b) by 2039 days.

(21) Appl. No.: 11/536,504

(22) Filed: Sep. 28, 2006

(51) Int. Cl.
*G06F 17/30* (2006.01)

(52) U.S. Cl.
USPC .................................. 707/706; 707/771

(58) Field of Classification Search
USPC .................................. 707/706, 771
See application file for complete search history.

(56) References Cited

U.S. PATENT DOCUMENTS

| | | |
|---|---|---|
| 4,888,690 A | 12/1989 | Huber |
| 4,899,292 A | 2/1990 | Montagna et al. |
| 5,010,478 A | 4/1991 | Deran |
| 5,544,051 A | 8/1996 | Senn et al. |
| 5,664,109 A | 9/1997 | Johnson et al. |
| 5,778,378 A | 7/1998 | Rubin |
| 5,815,415 A | 9/1998 | Bentley et al. |
| 5,832,479 A | 11/1998 | Berkowitz et al. |
| 5,870,739 A | 2/1999 | Davis, III et al. |
| 5,905,980 A | 5/1999 | Masuichi et al. |
| 5,946,692 A | 8/1999 | Faloutsos et al. |
| 5,963,940 A * | 10/1999 | Liddy et al. ............... 1/1 |
| 6,006,221 A | 12/1999 | Liddy et al. |
| 6,014,661 A | 1/2000 | Ahlberg et al. |
| 6,026,388 A | 2/2000 | Liddy et al. |
| 6,029,195 A | 2/2000 | Herz |
| 6,038,560 A | 3/2000 | Wical |
| 6,101,515 A | 8/2000 | Wical et al. |
| 6,105,020 A | 8/2000 | Lindsay et al. |
| 6,105,030 A | 8/2000 | Syed et al. |
| 6,192,357 B1 | 2/2001 | Krychniak |
| 6,216,138 B1 | 4/2001 | Wells et al. |

(Continued)

FOREIGN PATENT DOCUMENTS

| | | |
|---|---|---|
| JP | 11-265400 (A) | 9/1999 |
| JP | 2002-157276 | 5/2002 |

(Continued)

OTHER PUBLICATIONS

Brill, E. et al., "An Analysis of the AskMSR Question-Answering System," Proceedings of the Conference on Empirical Methods in Natural Language Processing (EMNLP), Jul. 2002, pp. 257-264.

(Continued)

*Primary Examiner* — Kim Nguyen
(74) *Attorney, Agent, or Firm* — Morgan, Lewis & Bockius LLP

(57) ABSTRACT

A query is defined that has an answer formed of terms from electronic documents. A repository having facts is examined to identify attributes corresponding to terms in the query. The electronic documents are examined to find other terms that commonly appear near the query terms. Hypothetical facts representing possible answers to the query are created based on the information identified in the fact repository and the commonly-appearing terms. These hypothetical facts are corroborated using the electronic documents to determine how many documents support each fact. Additionally, contextual clues in the documents are examined to determine whether the hypothetical facts can be expanded to include additional terms. A hypothetical fact that is supported by at least a certain number of documents, and is not contained within another fact with at least the same level of support, is presented as likely correct.

27 Claims, 10 Drawing Sheets

(56) References Cited

U.S. PATENT DOCUMENTS

| | | |
|---|---|---|
| 6,222,540 B1 | 4/2001 | Sacerdoti |
| 6,249,784 B1 | 6/2001 | Macke et al. |
| 6,263,328 B1 | 7/2001 | Coden et al. |
| 6,263,335 B1 * | 7/2001 | Paik et al. ............................ 1/1 |
| 6,304,864 B1 * | 10/2001 | Liddy et al. ..................... 706/15 |
| 6,311,189 B1 | 10/2001 | deVries et al. |
| 6,327,574 B1 | 12/2001 | Kramer et al. |
| 6,377,943 B1 | 4/2002 | Jakobsson |
| 6,480,194 B1 | 11/2002 | Sang'udi et al. |
| 6,519,631 B1 | 2/2003 | Rosenschein et al. |
| 6,529,900 B1 | 3/2003 | Patterson et al. |
| 6,584,464 B1 | 6/2003 | Warthen |
| 6,606,659 B1 | 8/2003 | Hegli et al. |
| 6,609,123 B1 | 8/2003 | Cazemier et al. |
| 6,629,097 B1 | 9/2003 | Keith |
| 6,643,641 B1 | 11/2003 | Snyder |
| 6,718,324 B2 | 4/2004 | Edlund et al. |
| 6,772,150 B1 | 8/2004 | Whitman et al. |
| 6,832,218 B1 | 12/2004 | Emens et al. |
| 6,850,896 B1 | 2/2005 | Kelman et al. |
| 6,873,982 B1 | 3/2005 | Bates et al. |
| 6,961,723 B2 | 11/2005 | Faybishenko et al. |
| 7,013,308 B1 | 3/2006 | Tunstall-Pedoe |
| 7,031,955 B1 | 4/2006 | de Souza et al. |
| 7,043,521 B2 | 5/2006 | Eitel |
| 7,100,083 B2 | 8/2006 | Little et al. |
| 7,146,538 B2 | 12/2006 | Johnson et al. |
| 7,158,983 B2 | 1/2007 | Willse et al. |
| 7,421,432 B1 | 9/2008 | Hoelzle et al. |
| 7,669,115 B2 | 2/2010 | Cho et al. |
| 7,953,720 B1 | 5/2011 | Rohde et al. |
| 8,065,290 B2 | 11/2011 | Hogue |
| 8,112,441 B2 | 2/2012 | Ebaugh et al. |
| 8,352,388 B2 * | 1/2013 | Estes ................................ 706/12 |
| 8,463,810 B1 * | 6/2013 | Rennison ....................... 707/771 |
| 8,510,321 B2 * | 8/2013 | Ranganathan et al. ......... 707/765 |
| 8,620,909 B1 * | 12/2013 | Rennison ....................... 707/723 |
| 2002/0065814 A1 | 5/2002 | Okamoto et al. |
| 2002/0065815 A1 | 5/2002 | Layden |
| 2002/0128818 A1 | 9/2002 | Ho et al. |
| 2002/0173984 A1 | 11/2002 | Robertson et al. |
| 2003/0005036 A1 | 1/2003 | Mitzenmacher |
| 2003/0046288 A1 | 3/2003 | Severino et al. |
| 2003/0069880 A1 | 4/2003 | Harrison et al. |
| 2003/0097357 A1 | 5/2003 | Ferrari et al. |
| 2003/0120644 A1 | 6/2003 | Shirota |
| 2003/0120654 A1 | 6/2003 | Edlund et al. |
| 2003/0154071 A1 | 8/2003 | Shreve |
| 2003/0158855 A1 | 8/2003 | Farnham et al. |
| 2003/0195872 A1 | 10/2003 | Senn |
| 2003/0208486 A1 | 11/2003 | Dettinger et al. |
| 2003/0208665 A1 | 11/2003 | Peir et al. |
| 2003/0217052 A1 | 11/2003 | Rubenczyk et al. |
| 2004/0015566 A1 | 1/2004 | Anderson et al. |
| 2004/0030731 A1 | 2/2004 | Iftode et al. |
| 2004/0107125 A1 | 6/2004 | Guheen et al. |
| 2004/0122844 A1 | 6/2004 | Malloy et al. |
| 2004/0122846 A1 | 6/2004 | Chess et al. |
| 2004/0123240 A1 | 6/2004 | Gerstl et al. |
| 2004/0125137 A1 | 7/2004 | Stata et al. |
| 2004/0167909 A1 | 8/2004 | Wakefield et al. |
| 2004/0220904 A1 | 11/2004 | Finlay et al. |
| 2004/0236655 A1 | 11/2004 | Scumniotales et al. |
| 2004/0255237 A1 | 12/2004 | Tong |
| 2004/0260714 A1 | 12/2004 | Chatterjee et al. |
| 2004/0267700 A1 | 12/2004 | Dumais et al. |
| 2005/0033803 A1 | 2/2005 | Vleet et al. |
| 2005/0039033 A1 | 2/2005 | Meyers et al. |
| 2005/0050016 A1 | 3/2005 | Stanoi et al. |
| 2005/0060277 A1 | 3/2005 | Zlatanov et al. |
| 2005/0076012 A1 | 4/2005 | Manber et al. |
| 2005/0086222 A1 | 4/2005 | Wang et al. |
| 2005/0086520 A1 | 4/2005 | Dharmapurikar et al. |
| 2005/0108630 A1 | 5/2005 | Wasson et al. |
| 2005/0120004 A1 | 6/2005 | Stata et al. |
| 2005/0187898 A1 | 8/2005 | Chazelle et al. |
| 2005/0219929 A1 | 10/2005 | Navas |
| 2005/0256825 A1 | 11/2005 | Dettinger et al. |
| 2006/0004851 A1 | 1/2006 | Gold et al. |
| 2006/0020582 A1 | 1/2006 | Dettinger et al. |
| 2006/0047838 A1 | 3/2006 | Chauhan |
| 2006/0053175 A1 | 3/2006 | Gardner et al. |
| 2006/0064429 A1 | 3/2006 | Yao |
| 2006/0085386 A1 | 4/2006 | Thanu et al. |
| 2006/0085465 A1 | 4/2006 | Nori et al. |
| 2006/0112110 A1 | 5/2006 | Maymir-Ducharme et al. |
| 2006/0136585 A1 | 6/2006 | Mayfield et al. |
| 2006/0149700 A1 | 7/2006 | Gladish et al. |
| 2006/0173824 A1 | 8/2006 | Bensky et al. |
| 2006/0206508 A1 | 9/2006 | Colace et al. |
| 2006/0224582 A1 | 10/2006 | Hogue |
| 2006/0248456 A1 | 11/2006 | Bender et al. |
| 2007/0022085 A1 | 1/2007 | Kulkarni |
| 2007/0055656 A1 | 3/2007 | Tunstall-Pedoe |
| 2007/0067108 A1 | 3/2007 | Buhler et al. |
| 2007/0179965 A1 | 8/2007 | Hogue et al. |
| 2007/0203867 A1 | 8/2007 | Hogue et al. |
| 2007/0203868 A1 | 8/2007 | Betz |
| 2007/0271249 A1 | 11/2007 | Cragun et al. |
| 2008/0005064 A1 | 1/2008 | Sarukkai |
| 2008/0097958 A1 | 4/2008 | Ntoulas et al. |
| 2008/0104019 A1 | 5/2008 | Nath |
| 2012/0036145 A1 * | 2/2012 | Tunstall-Pedoe ............. 707/760 |

FOREIGN PATENT DOCUMENTS

| | | |
|---|---|---|
| JP | 2002-540506 (A) | 11/2002 |
| JP | 2003-281173 (A) | 10/2003 |
| WO | WO 2004/114163 A2 | 12/2004 |

OTHER PUBLICATIONS

Brin, S., "Extracting Patterns and Relations from the World Wide Web," 12 pages.

Chang, C. et al., "IEPAD: Information Extraction Based on Pattern Discovery," WWW10 '01, ACM, May 1-5, 2001, pp. 681-688.

Chu-Carroll, J. et al., "A Multi-Strategy with Multi-Source Approach to Question Answering," 8 pages.

Dean, J. et al., "MapReduce: Simplified Data Processing on Large Clusters," To appear in OSDI 2004, pp. 1-13.

Etzioni, O. et al., "Web-scale Information Extraction in KnowItAll (Preliminary Results)," WWW2004, ACM, May 17-20, 2004, 11 pages.

Freitag, D. et al., "Boosted Wrapper Induction," American Association for Artificial Intelligence, 2000, 7 pages.

Guha, R. et al., "Disambiguating People in Search," WWW2004, ACM, May 17-22, 2004, 9 pages.

Guha, R., "Object Co-identification on the Semantic Web," WWW2004, ACM, May 17-22, 2004, 9 pages.

Hogue, A.W., "Tree Pattern Inference and Matching for Wraoper Induction on the World Wide Web," Master of Engineering in Electrical Engineering and Computer Science, Massachusetts Institute of Technology, Jun. 2004, pp. 1-106.

"Information Entropy—Wikipedia, the free encyclopedia," [online] [Retrieved on May 3, 2006] Retrieved from the Internet<URL:http://en.Wkipedia.org/wiki/Information_entropy>.

"Information Theory—Wikipedia, the free encyclopedia," [online] [Retrieved on May 3, 2006] Retrieved from the Internet<URL:http://en.wikipedia.org/wiki/Information_theory>.

Jones, R. et al., "Bootstrapping for Text Learning Tasks," 12 pages.

Kosseim, L, et al., "Answer Formulation for Question-Answering." 11 pages.

Liu, B. et al., "Mining Data Records in Web Pages," Conference '00, ACM, 2000, pp. 1-10.

McCallum, A. et al., "Object Consolodation by Graph Partitioning with a Conditionally-Trained Distance Metric," SIGKDD '03, ACM, Aug. 24-27, 2003, 6 pages.

Mihalcea, R. et al., "PageRank on Semantic Networks, with Application to Word Sense Disambiguation," 7 pages.

Mihalcea, R. et al., "TextRank: Bringing Order into Texts," 8 pages.

(56) References Cited

OTHER PUBLICATIONS

PCT International Search Report and Written Opinion, PCT/US06/07639, Sep. 13, 2006, 6 pages.
Prager, J. et al., "IBM's PIQUANT in TREC2003," 10 pages.
Prager, J. et al., "Question Answering using Constraint Satisfaction: QA-by-Dossier-with-Constraints," 8 pages.
Ramakrishnan, G. et al., "Is Question Answering an Acquired Skill?", WWW2004, ACM, May 17, 2004, pp. 111-120.
Anick, Using Terminological Feedback for Web Search Refinement-A Log-based Study, ACM 2003, SIGIR '03, Toronto, Canada, Jul. 28-Aug. 1, 2003, 8 pgs.
Bharat, Personalized, interactive news on the web, May 5, 1997, 22 pgs.
Bloom filter, Wikipedia, Feb. 13, 2005, 4 pgs.
Bloom, Space/time trade-offs in hash coding with allowable errors, Jul. 1970, 5 pgs.
Brin, The anatomy of a large-scale hypertextual search engine, 1998, 26 pgs.
Cao, Bloom filters—the math, Jul. 5, 1998, 6 pgs.
Chesnais, The Fishwrap personalized new system, community networking, Jun. 20-22, 1995, 8 pgs.
Clarke, FrontPage 2002 tutorials—adding functionality to your website with FrontPage 2002 part II—navigation, Apr. 2002, 8 pgs.
Cowie, MOQA: Meaning-oriented question answering, 2004, 15 pgs.
Google Inc., International Preliminary Report on Patentability, PCT/US2007/061158, Jul. 29, 2008, 7 pgs.
Google Inc., International Search Report/Written Opinion, PCT/US2007/061156, Feb. 11, 2008, 5 pgs.
Google Inc., International Search Report/Written Opinion, PCT/US2006/010965, Jul. 5, 2006, 9 pgs.
Google Inc., International Search Report/Written Opinion, PCT/US2007/061157, Feb. 15, 2008, 10 pgs.
Google Inc., Office Action, CA 2610208, Sep. 21, 2011, 3 pgs.
Google Inc. Office Action, JP 2008-504204, Oct. 12, 2011, 2 pgs.
Hogue, Decision on Appeal, U.S. Appl. No. 11/342,277, Jan. 24, 2014, 7 pgs.
Hogue, Final Office Action, U.S. Appl. No. 11/356,679, Dec. 3, 2007, 22 pgs.
Hogue, Office Action, U.S. Appl. No. 11/097,676, Jun. 28, 2007, 12 pgs.
Hogue, Office Action, U.S. App. No. 11/097,676, Dec. 31, 2007, 13 pgs.
Hogue, Office Action, U.S. Appl. No. 11/341,907, Jan. 8, 2008, 13 pgs.
Hogue, Office Action, U.S. Appl. No. 11/341,907, Dec. 17, 2009, 22 pgs.
Hogue, Office Action, U.S. Appl. No. 11/341,907, Jul. 24, 2009, 17 pgs.
Hogue, Office Action, U.S. Appl. No. 11/341,907, Nov. 24, 2008, 14 pgs.
Hogue, Office Action, U.S. Appl. No. 11/341,907, Jul. 27, 2010, 21 pgs.
Hogue, Office Action, U.S. Appl. No. 11/341,907, Jul. 31, 2008, 17 pgs.
Hogue, Office Action, U.S. Appl. No. 11/342,277, Dec. 8, 2008, 23 pgs.
Hogue, Office Action, U.S. Appl. No. 11/342,277, Dec. 16, 2009, 25 pgs.
Hogue, Office Action, U.S. Appl. No. 11/342,277, Aug. 18, 2008, 26 pgs.
Hogue, Office Action, U.S. Appl. No. 11/342,277, Jan. 22, 2008, 21 pgs.
Hogue, Office Action, U.S. Appl. No. 11/342,277, Jul. 26, 2010, 26 pgs.
Hogue, Office Action, U.S. Appl. No. 11/342,277, Jul. 27, 2009, 21 pgs.
Hogue, Office Action, U.S. Appl. No. 11/342,290, Aug. 7, 2008, 39 pgs.
Hogue, Office Action, U.S. Appl. No. 11/342,290, Jan. 24, 2008, 36 pgs.
Hogue, Office Action, U.S. Appl. No. 11/342,293, Apr. 3, 2009, 13 pgs.
Hogue, Office Action, U.S. Appl. No. 11/342,293, Jan. 18, 2008, 13 pgs.
Hogue, Office Action, U.S. Appl. No. 11/342,293, Jun. 18, 2010, 22 pgs.
Hogue, Office Action, U.S. Appl. No. 11/342,293, May 20, 2008, 18 pgs.
Hogue, Office Action, U.S. Appl. No. 11/342,293, Oct. 21, 2009, 15 pgs.
Hogue, Office Action, U.S. Appl. No. 11/342,293, Sep. 29, 2008, 14 pgs.
Hogue, Office Action, U.S. Appl. No. 11/356,679, May 13, 2008, 19 pgs.
Hogue, Office Action, U.S. Appl. No. 11/356,679, Mar. 16, 2009, 20 pgs.
Hogue, Office Action, U.S. Appl. No. 11/356,679, Dec. 18, 2009, 16 pgs.
Hogue, Office Action, U.S. Appl. No. 11/356,679, Jul. 20, 2010, 21 pgs.
Hogue, Office Action, U.S. Appl. No. 11/356,679, Jun. 21, 2011, 15 pgs.
Hogue, Office Action, U.S. Appl. No. 11/356,679, Sep. 24, 2008, 19 pgs.
Hogue, Office Action, U.S. Appl. No. 11/356,679, Feb. 29, 2012, 15 pgs.
Hogue, Office Action, U.S. Appl. No. 11/356,679, Mar. 29, 2013, 24 pgs.
Hogue, Office Action, U.S. Appl. No. 11/356,679, Jul. 30, 2009, 15 pgs.
Hogue, Office Action, U.S. Appl. No. 11/356,851, Apr. 1, 2009, 9 pgs.
Hogue, Office Action, U.S. Appl. No. 11/356,851, Apr. 7, 2008, 15 pgs.
Hogue, Office Action, U.S. Appl. No. 11/356,851, Nov. 12, 2009, 10 pgs.
Hogue, Office Action, U.S. Appl. No. 11/356,851, Oct. 16, 2008, 10 pgs.
Ilyas, Rank-aware query optimization, Jun. 13-18, 2004, 12 pgs.
Kamba, An interactive, personalized, newspaper on the web, 1993, 12 pgs.
Kehlenbeck, Office Action, U.S. Appl. No. 11/357,748, Sep. 11, 2007, 19 pgs.
Kehlenbeck, Office Action, U.S. Appl. No. 11/357,748, Jan. 23, 2007, 10 pgs.
Lin, Question answering from web using knowledge annotation and knowledge mining techniques, Nov. 3-8, 2003, 8 pgs.
Nyberg, The JAVELIN question-answering system at TREC2003: a multi strategy approach with dynamic planning, Nov. 18-21, 2003, 9 pgs.
Ogden, Improving cross-language text retrieval with human interations, 2000, 9 pgs.
Ritchford, Final Office Action, U.S. Appl. No. 13/292,017, Oct. 25, 2013, 17 pgs.
Ritchford, Final Office Action, U.S. Appl. No. 13/292,030, Apr. 25, 2014, 16 pgs.
Ritchford, Office Action, U.S. Appl. No. 11/356,728, Oct. 7, 2010, 54 pgs.
Ritchford, Office Action, U.S. Appl. No. 11/356,728, May 21, 2008, 25 pgs.
Ritchford, Office Action, U.S. Appl. No. 11/356,728, Nov. 26, 2008, 25 pgs.
Ritchford, Office Action, U.S. Appl. No. 11/356,728, May 27, 2009, 34 pgs.
Ritchford, Office Action, U.S. Appl. No. 11/356,728, Jan. 28, 2010, 50 pgs.
Ritchford, Office Action, U.S. Appl. No. 13/292,017, Feb. 1, 2013, 15 pgs.
Ritchford, Office Action, U.S. Appl. No. 13/292,017, Apr. 24, 2012, 9 pgs.

(56) References Cited

OTHER PUBLICATIONS

Ritchford, Office Action, U.S. Appl. No. 13/292,030, May 1, 2012, 11 pgs.
Ritchford, Office Action, U.S. Appl. No. 13/292,030, Jan. 4, 2013, 15 pgs.
Ritchford, Office Action, U.S. Appl. No. 13/292,030, Jan. 6, 2014, 16 pgs.
Rochelle, Office Action, U.S. Appl. No. 11/749,679, Oct. 8, 2010, 8 pgs.
Rochelle, Office Action, U.S. Appl. No. 11/749,679, Mar. 22, 2010, 8 pgs.
The MathWorks, Using Matlab Graphics, Dec. 1996, 52 pgs.
Thompson, Freshman publishing experiment offers made-to-order newspaper, 1994, 4 pgs.
Vespe, Office Action, U.S. Appl. No. 11/535,843, Aug. 18, 2009, 16 pgs.
Vespe, Office Action, U.S. Appl. No. 11/535,843, Dec. 23, 2008, 15 pgs.
Ritchford, Office Action, U.S. Appl. No. 13/292,017, Jun. 16, 2014, 15 pgs.

* cited by examiner

Example Format Of Facts In Repository
(Each Fact Is Associated With An Object ID)

Example Of Facts In Repository
(Each Fact Is Associated With An Object ID)

Example Object Reference Table

| Object ID | Fact ID | Attribute | Value | Link | Metrics | Sources | Agent | } 204 |
|---|---|---|---|---|---|---|---|---|
| Object ID | Fact ID | Attribute | Value | Link | Metrics | Sources | Agent | } 204 |
| Object ID | Fact ID | Name | | Link | Metrics | Sources | Agent | } 207 |
| Object ID | Fact ID | Property | Value | Link | Metrics | Sources | Agent | } 208 |

· · ·

Example Format Of Facts In Repository
(Each Fact Is Associated With An Object ID)

FIG. 2D

Example Objects

US 8,954,412 B1

CORROBORATING FACTS IN ELECTRONIC DOCUMENTS

RELATED APPLICATION

This application is related to U.S. application Ser. No. 11/394,552, filed Mar. 31, 2006, which is a continuation-in-part of U.S. application Ser. No. 11/097,699, filed on Mar. 31, 2005. Both applications are hereby incorporated by reference herein.

BACKGROUND OF THE INVENTION

1. Field of the Invention

This invention pertains in general to fact databases and, more particularly, to derivation and corroboration of facts for the databases.

2. Description of the Related Art

The World Wide Web on the Internet, and the web pages within the Web, are a vast source of factual information. Users may look to web pages to get answers to factual questions, such as "what is the capital of Poland" or "what is the birth date of George Washington." Web search engines, however, may be unhelpful to users in this regard, as they generally do not provide a simple, succinct answer to factual queries such as the ones described above. Rather, web search engines provide to the user a list of web pages that are determined to match the query, and the user has to sort through the matching web pages to find the answer.

Attempts that have been made to build search engines that can provide quick answers to factual questions have their own shortcomings. For example, some search engines draw their facts from a single source, such as a particular encyclopedia. This restriction limits the types of questions that these engines can answer. For instance, a search engine based on an encyclopedia is unlikely to answer many questions concerning popular culture, such as questions about movies, songs or the like, and is also unlikely to answer many questions about products, services, retail and wholesale businesses and so on. If the set of sources used by such a search engine were to be expanded, however, such expansion might introduce the possibility of contradictory or ambiguous answers. Furthermore, as the universe of sources expands, information may be drawn from untrustworthy sources or sources of unknown reliability.

SUMMARY OF THE INVENTION

Embodiments of the present invention address the problems described above and other problems by providing a method, system, and computer program product for identifying facts described by electronic documents. In one embodiment, the method, system, and computer program product define a query, the query posing a question having an answer formed of terms from the electronic documents, and create one or more hypothetical facts in response to the query and the electronic documents. Each hypothetical fact represents a possible answer to the query. The hypothetical facts are corroborated using the electronic documents to identify a likely correct fact. The likely correct fact is presented as the answer to the query.

BRIEF DESCRIPTION OF THE DRAWINGS

FIGS. 2(a)-2(d) are block diagrams illustrating a data structure for facts within the repository of FIG. 1 according to some embodiments.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
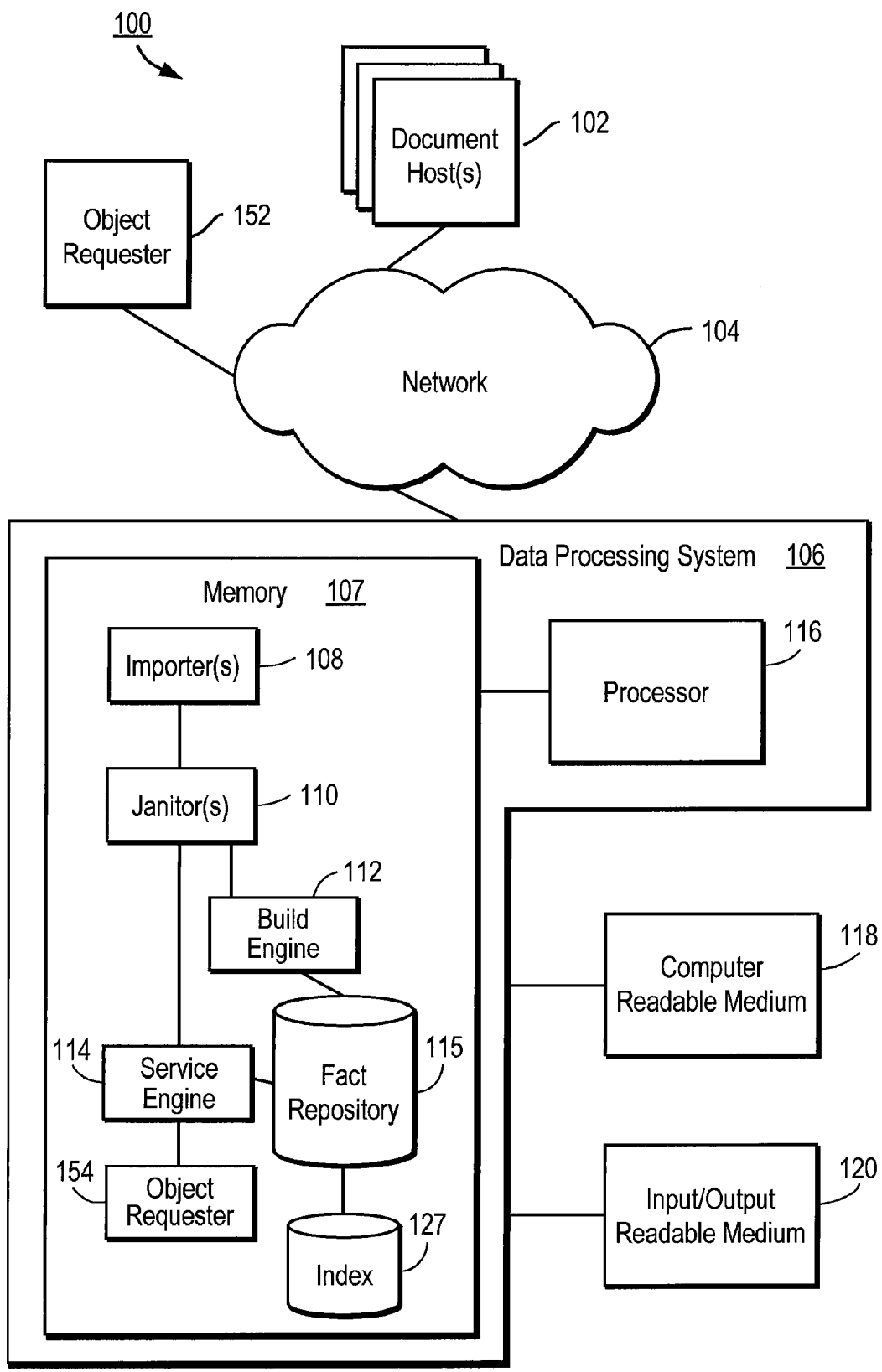
FIG. 1 shows a system architecture adapted to manage a fact repository according to one embodiment.

FIG. 1 shows a system architecture 100 adapted to manage a fact repository 115 according to one embodiment. FIG. 1 shows components used to add facts into, and retrieve facts from the repository 115. The system architecture 100 includes a network 104, through which any number of document hosts 102 communicate with a data processing system 106, along with any number of object requesters 152, 154.

Document hosts 102 store electronic documents and provide access to documents. A document is comprised of any machine-readable data including any combination of text, graphics, multimedia content, etc. A document may be encoded in a markup language, such as Hypertext Markup Language (HTML), i.e., a web page, in a interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

Data processing system 106 includes one or more importers 108, one or more janitors 110, a build engine 112, a service engine 114, and the fact repository 115 (also called simply the "repository"). Each of the foregoing are implemented, in one embodiment, as software modules (or programs) executed by processor 116. Importers 108 operate to process documents received from the document hosts 102, read the data content of documents, and extract facts (as operationally and programmatically defined within the data processing system 106) from such documents. The importers 108 also determine the subject or subjects with which the facts are associated, and extract such facts into individual items of data, for storage in the repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names and values, and delete duplicate and near-duplicate facts so an object does not have redundant information. For example, we might find on one page that Britney Spears' birthday is "12/2/1981" while on another page that her date of birth is "December 2, 1981." Birthday and Date of Birth might both be rewritten as "Birth Date" by one janitor and then another janitor might notice that 12/2/1981 and December 2, 1981 are different forms of the same date. It would choose the preferred form, remove the other fact and combine the source lists for the two facts. As a result when you look at the source pages for this fact, on some you will find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by the janitors 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(a)-2(d).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components for accessing repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 also includes standard software components such as operating systems and the like and further includes standard hardware components not shown in the figure for clarity of example.

In one embodiment, the contents of the facts in the repository 115 are also indexed in index 127. The index 127 maintains a term index, which maps terms to {object, fact, field, token} tuples, where "field" is, e.g., an attribute or value. The service engine 114 is adapted to receive keyword queries from clients such as object requestors 154, and communicates with the index 127 to retrieve the facts that are relevant to user's search query. For a generic query containing one or more terms, the service engine 114 assumes the scope is at the object level. Thus, any object with one or more of the query terms somewhere (not necessarily on the same fact) will match the query for purposes of being ranked in the search results. The query syntax can also be used to limit results to only certain objects, attributes, and/or values.

In one embodiment the ranking (score) of an object is a linear combination of relevance scores for each of the facts. The relevance score for each fact is based on whether the fact includes one or more query terms (a hit) in either the attribute or value portion of the fact. Each hit is scored based on the frequency of the term that is hit, with more common terms getting lower scores, and rarer terms getting higher scores (e.g., using a TD-IDF based term weighting model). The fact score is then adjusted based on additional factors. These factors include the appearance of consecutive query terms in a fact, the appearance of consecutive query terms in a fact in the order in which they appear in the query, the appearance of an exact match for the entire query, the appearance of the query terms in the name fact (or other designated fact, e.g., property or category), and the percentage of facts of the object containing at least one query term. Each fact's score is also adjusted by its associated confidence measure and by its importance measure. Since each fact is independently scored, the facts most relevant and important to any individual query can be determined, and selected. In one embodiment, a selected number (e.g., 5) of the top scoring facts are retrieved in response to query.

Figure 2A:
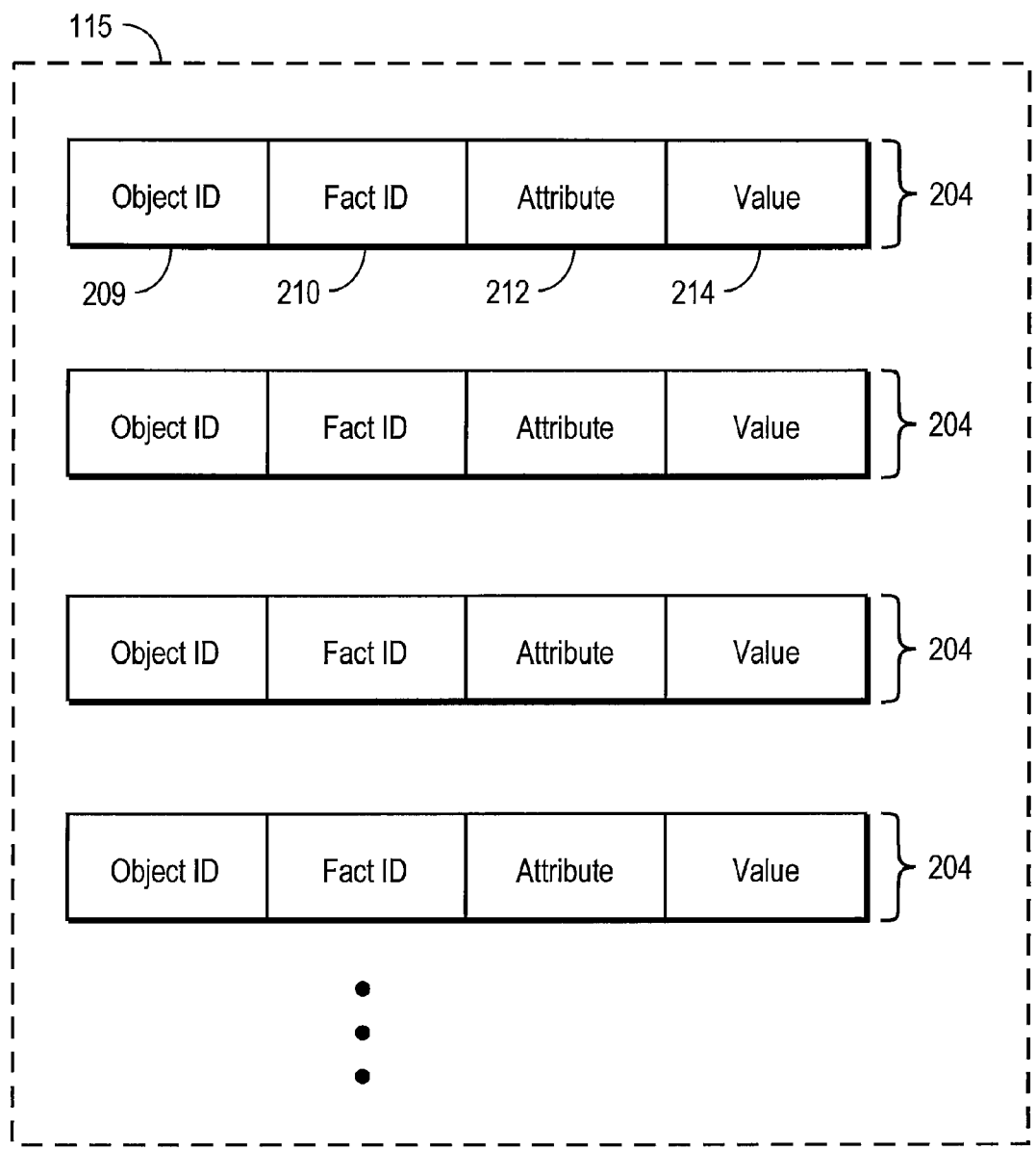

FIG. 2(a) shows an example format of a data structure for facts within repository 115 according to some embodiments. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
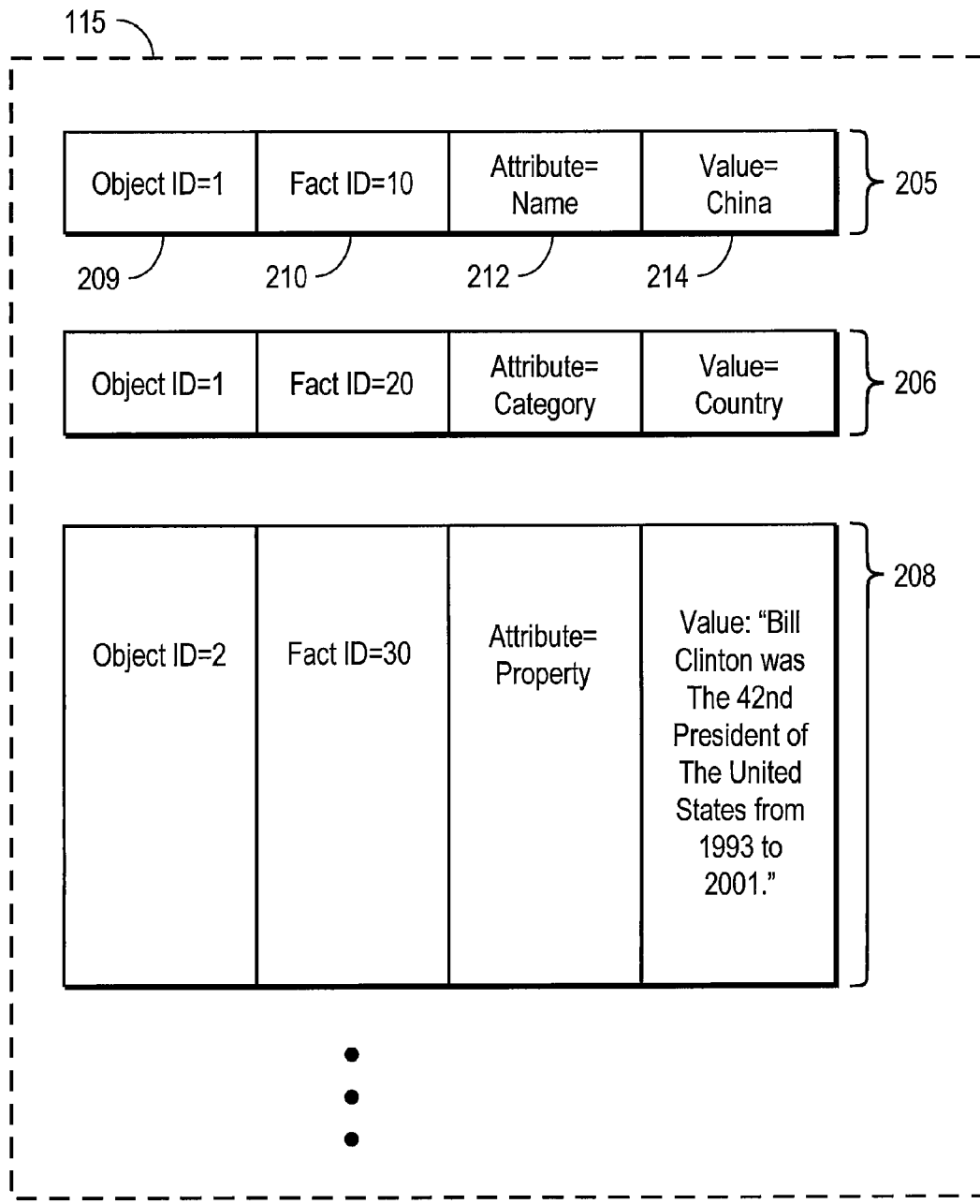

FIG. 2(b) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" could have a value including several paragraphs of text, numbers, perhaps even tables of figures. This content can be formatted, for example, in a markup language. For example, a fact having an attribute "original html" might have a value of the original html text taken from the source document.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
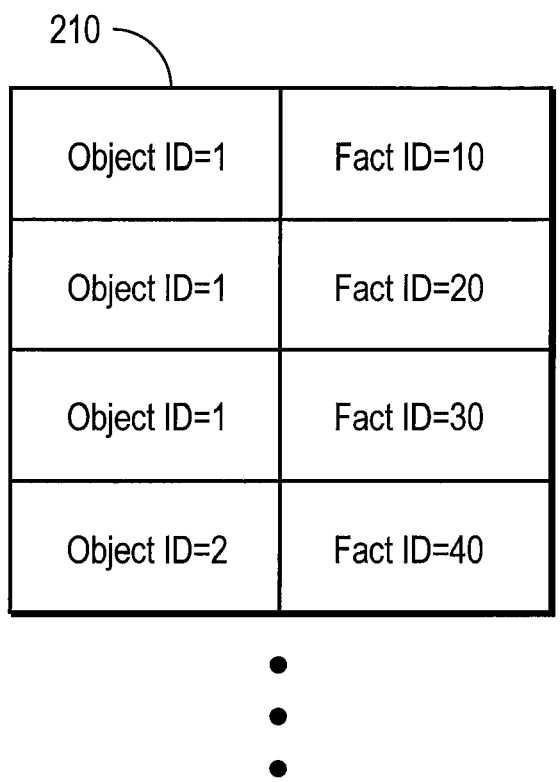

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(b) and 2(c) illustrate the object reference table 210 with explicit coding of object and fact IDs, the table also may contain just the ID values themselves in column or pair-wise arrangements.

FIG. 2(d) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2E:
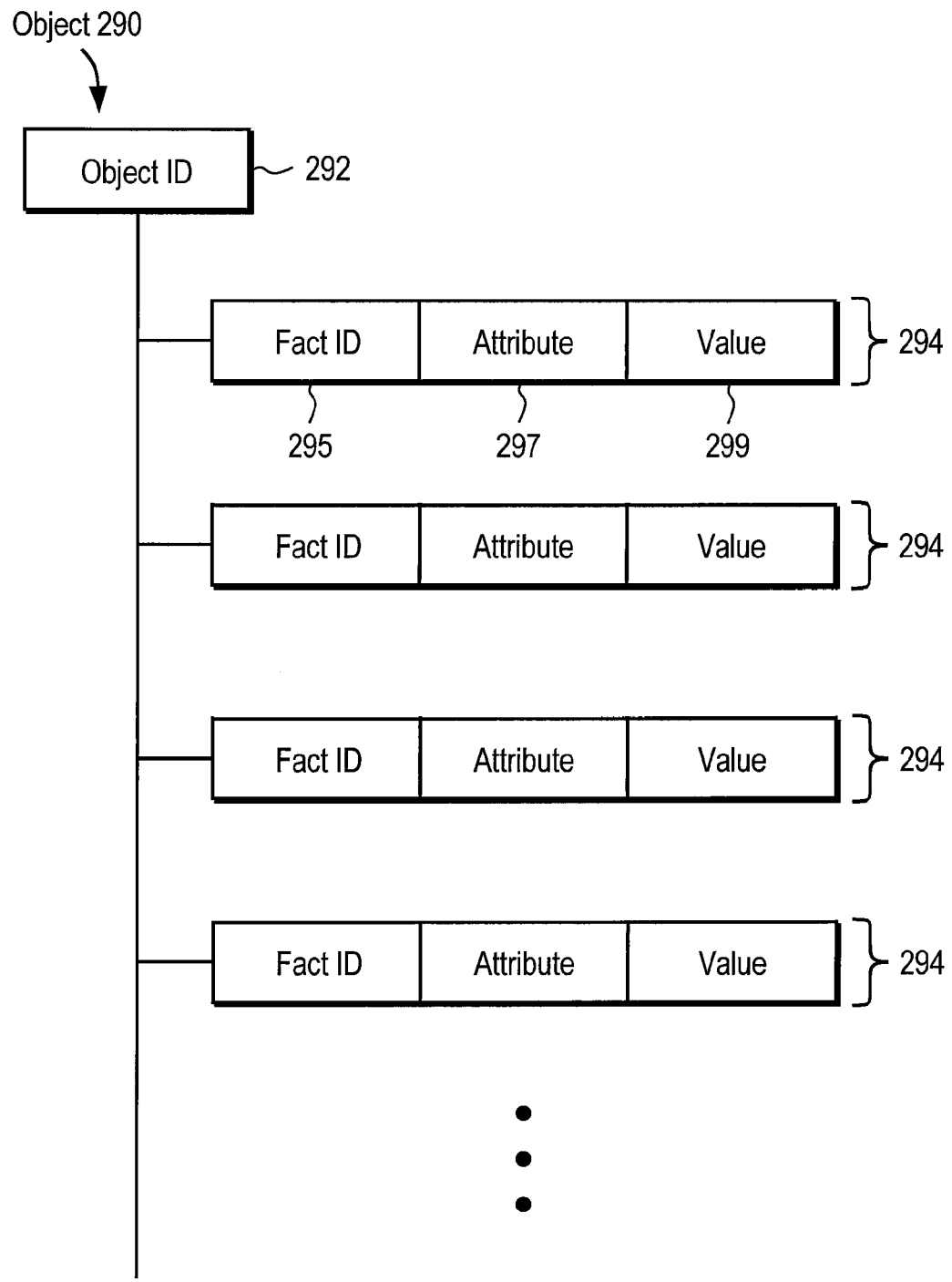
FIG. 2(e) is a block diagram illustrating an alternate data structure for facts and objects according to some embodiments.

FIG. 2(e) is a block diagram illustrating an alternate data structure 290 for facts and objects according to some embodiments. In this data structure, an object 290 contains an object ID 292 and references or points to facts 294. Each fact includes a fact ID 295, an attribute 297, and a value 299. In this embodiment, an object 290 actually exists in memory 107.

Figure 3:
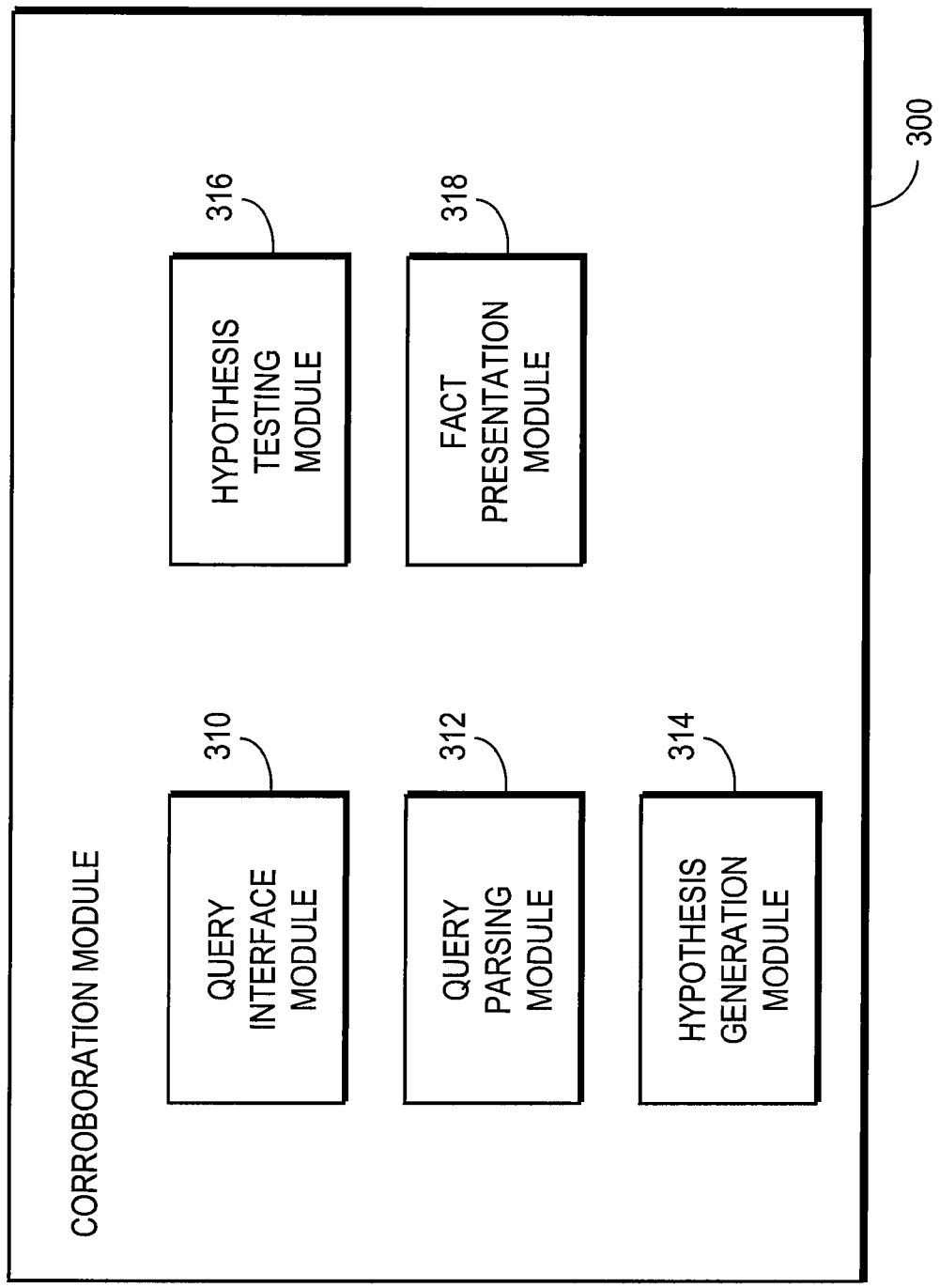
FIG. 3 is a high-level block diagram illustrating modules within a corroboration module according to one embodiment.

FIG. 3 is a high-level block diagram illustrating modules within a corroboration module 300 according to one embodiment. The corroboration module 300 analyzes electronic documents on the document hosts 102 and/or stored elsewhere on the network 104 to identify hypothetical facts contained therein that might answer a query. The corroboration module 300 corroborates the hypothetical facts using the documents to identify hypothetical facts that are likely correct. The likely correct facts are presented on a web page, stored in the repository 115 to support future fact queries, and/or utilized for other purposes.

In one embodiment, the corroboration module 300 is located on an object requestor 152, 154 as described with respect to FIG. 1. In other embodiments, the corroboration module 300 is implemented as a janitor 110 or is located on another data processing system in communication with the repository 115. As used herein, the term "module" refers to computer program logic and/or data for providing the specified functionality. A module can be implemented in hardware, firmware, and/or software. Some embodiments have different and/or additional modules than those shown in FIG. 3. Moreover, the functionalities can be distributed among the modules in a different manner than described here.

A query interface module 310 defines a search query having a set of query terms. The query interface module 310 can define the query based on an explicit query provided by a user. For example, the query interface module 310 can receive a query that the user enters into a text box on a page of a web site. Likewise, the query interface module 310 can define a query based on other user actions and/or in response to other data, such as queries derived based on a user's web browsing history. In some embodiments, the query interface module 310 defines queries in real time, as they are provided by users. In other embodiments, the query interface module 310 defines a set of queries based on historical data. For example, the query interface module 310 can receive a set of historical queries provided by users over a time period (e.g., the prior week), and/or based on other historical data.

In one embodiment, the defined query poses a question having an answer composed of terms from the electronic documents. Assume for purposes of this description that the query interface module 310 defines the query "Who did William Frawley play"? A correct answer to this query is the name "Fred Mertz," as that is the name of the character played by William Frawley in the TV series "I Love Lucy," his most famous role. Another correct answer is "Bub," the role he played on "My Three Sons."

A query parsing module 312 parses the defined query to identify possible attribute names and/or values contained within it. In one embodiment, the query parsing module 312 filters out noise words. Noise words are commonly occurring words that do not serve to limit the query. Examples of noise words include "a," "and," "is," and "the," although the specific words filtered by the parsing module 312 depend upon the embodiment. The query parsing module 312 searches the repository 115 for objects, facts, or attributes that correspond to the filtered query terms. For example, the query parsing module 312 identifies an object having a "name" attribute with the value "William Frawley" and an attribute type called "play." The William Frawley object need not have an existing "play" attribute; rather, the object need only be capable of having such an attribute to match the query. Thus, the query parsing module 312 identifies the fact "name: William Frawley" and the attribute name "play" based on the defined query.

A hypothesis generation module 314 generates a set of hypothetical facts that satisfy the query. In one embodiment, the hypothesis generation module 314 identifies a set of electronic documents that have terms corresponding to the query. For example, one embodiment of the module 314 executes a search for web pages on the Internet that contain the filtered terms from the query.

The hypothesis generation module 314 analyzes the set of corresponding documents to identify a set of terms corresponding to the query. In one embodiment, the hypothesis generation module 314 identifies snippets of text surrounding the query terms in the documents. The hypothesis generation module 314 filters the noise words out of the text snippets, and identifies the terms (i.e., single words) that occur most frequently in the snippets.

Thus, the hypothesis generation module 314 identifies a set of common terms related to the query. Each term fall into one of three categories: 1) the term is not an answer to the query; 2) the term is the answer to the query; or 3) the term is a partial answer to the query. For purposes of this description, assume that the terms identified by the hypothesis generation module 314 in response to the query "who did William Frawley play" include "Vivian" (wrong), "Love" (wrong), and "Fred" (partial).

In response to these results, the hypothesis generation module 314 creates an object having any real facts from the repository that matched the query, and a set of hypothetical facts based on the attributes from the repository that matched the query and the identified common terms. In one embodiment, each hypothetical fact includes an attribute that matched the query, and a single word common term. In the described example, the object has facts as follows:

Name: "William Frawley"
Play: "Vivian"
Play: "Fred"
Play: "Bub"

In this object, the "name" fact is a real fact extracted from the repository, and the "Play" facts are hypothetical facts having values from the terms identified by the hypothesis generation module 314 from the document snippets. The facts having the "Play" attribute represent hypothetical answers to the question posed by the query.

The hypothesis testing module 316 receives the object created by the hypothesis generation module 314 and tests the hypothetical facts contained therein to determine whether any of them are correct or partial answers to the query. In one embodiment, the hypothesis testing module 316 performs the test by determining how many documents support the facts, and/or expanded versions of the hypothetical facts. A hypothetical fact that is supported by enough documents to surpass a threshold, and not contained within another hypothetical fact having at least the same number of supporting documents, is treated as a likely correct fact and an answer to the query.

For example, assume that the results of the hypothesis testing module 316 are as follows:

| Fact | Supporting Documents |
|---|---|
| Play: "Vivian" | 15 |
| Play: "Vivian Vance" | 10 |
| Play: "Fred" | 35 |
| Play: "Fred Mertz" | 35 |
| Play: "Bub" | 33 |

Also assume that the threshold for a hypothetical fact to be considered likely correct is 30 supporting documents. In this example, the facts having the values "Vivian" and "Vivian Vance" fall below the threshold. The fact having the value "Fred" has enough support to surpass the threshold, but is contained within another fact "Fred Mertz" having the same level of support. Thus, the "Fred Mertz" fact is treated as likely correct while the "Fred" fact is not. The "Bub" fact also has enough support to be treated as likely correct.

In one embodiment, a fact presentation module 318 presents the identified one or more likely correct facts. This presentation can take a variety of forms depending upon the embodiment. In one embodiment, the fact presentation module 318 presents a likely correct fact to the user that provided the search query by, for example, displaying it on a web page provided to the user. In another embodiment, the fact presentation module 318 presents the fact by storing it in the repository 115. In the example described here, there is an existing object in the repository 115 for William Frawley. The fact presentation module 318 therefore adds the facts "Play: 'Fred Mertz'" and "Play: 'Bub'" to that object so they can be used to answer future queries. If the object does not already exist, an embodiment of the fact presentation module 318 creates a new object having the true and likely correct facts from the object created by the hypothesis generation module 314. In some embodiments, the likely correct facts are not added directly to the repository 115, but instead are filtered for accuracy. For example, the corroborated facts can be added to a queue that allows the facts to be examined by human administrators before being added to the repository 115.

Figure 4:
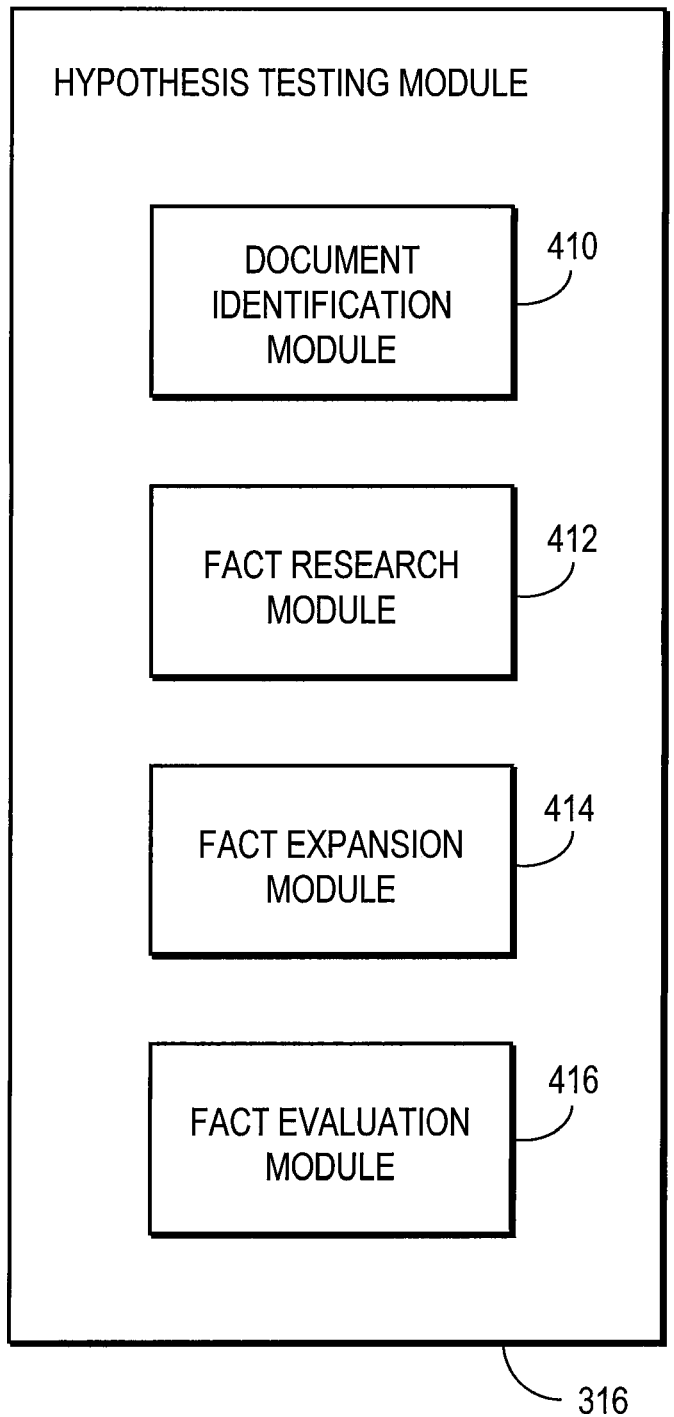
FIG. 4 is a high-level block diagram illustrating modules within the hypothesis testing module of the corroboration module according to one embodiment.

FIG. 4 is a high-level block diagram illustrating modules within the hypothesis testing module 316 according to one embodiment. Some embodiments have different and/or additional modules than those shown in FIG. 4. Moreover, the functionalities can be distributed among the modules in a different manner than described here.

A document identification module 410 receives an object having at least one hypothetical fact and identifies a set of documents from the document hosts 102 or elsewhere that are relevant to the object. In one embodiment, the documents on the document hosts 102 examined by the document identification module 410 are drawn from particular domains, such as web pages known to describe facts about certain subjects. In other embodiments, the documents are not drawn from any particular domain.

In one embodiment, a document is relevant to an object if the document contains a term, such as an attribute name or value, from the object. Thus, in the example where the object contains the hypothetical fact "Play: Fred," the document identification module 410 identifies a document as relevant if it includes "Play" or "Fred." For an object having multiple real and hypothetical facts, the document identification module 410 typically identifies a large set of documents. Some documents might include terms from many of facts, while others will include a term from only one fact.

A fact research module 412 determines whether a document in the set identified by the document identification module 410 supports a particular true or hypothetical fact from an object. In one embodiment, the fact research module 412 determines whether a document mentions both the attribute (e.g., "Play") and value (e.g., "Fred Mertz") of the fact. If the document mentions a fact, it is added to the source list for the fact because the document supports (i.e., corroborates) the fact.

A fact expansion module 414 analyzes a document that supports a hypothetical fact and attempts to expand the number of terms in the value of the hypothetical fact. A value is expanded by examining the document in which it appears for contextual clues supporting an expansion. An embodiment of the fact expansion module 414 analyzes the HTML or other markup language of the document to determine whether a value mentioned in it can be expanded to include terms adjacent to the value. A value is expanded to include the terms within the smallest enclosing intertag (e.g., that is between the same set of HTML "open" and "close" tags).

For example, assume that the value of the hypothetical fact is "Fred" and the HTML of a matching web page is as follows:

...
<tr>
<td>played</td>
<td><font color=blue>Fred Mertz</font><td>
</tr>
...

In this example, the terms "Fred" and "Mertz" are within the <font> tags. Thus, the fact expansion module 414, when operating on a fact with the value "Fred," will expand the value to "Fred Mertz" because the term "Mertz" is within the smallest enclosing set of intertags. One embodiment of the fact expansion module 414 limits the number of terms in an expanded fact based on a threshold. For example, the fact expansion module 414 can limit the value of a fact to a maximum of 20 terms.

Some embodiments of the fact expansion module 414 utilize contextual clues other than intertags to expand the values of hypothetical facts. For example, one embodiment identifies attribute names and values that appear in tables of the document. An attribute name appearing in a left-hand column of row table is assumed to have a corresponding value in an adjacent column. The fact expansion module 414 expands the value of the hypothetical fact to include the contents of the adjacent column.

A fact evaluation module 416 evaluates a set of one or more hypothetical facts and determines whether any of the facts are likely correct. An embodiment of the fact evaluation module 416 declares a fact likely correct if the number of documents supporting the fact surpasses a threshold and the value of the fact is not contained within another fact having at least the same number of supporting documents, as described above.

Figure 5:
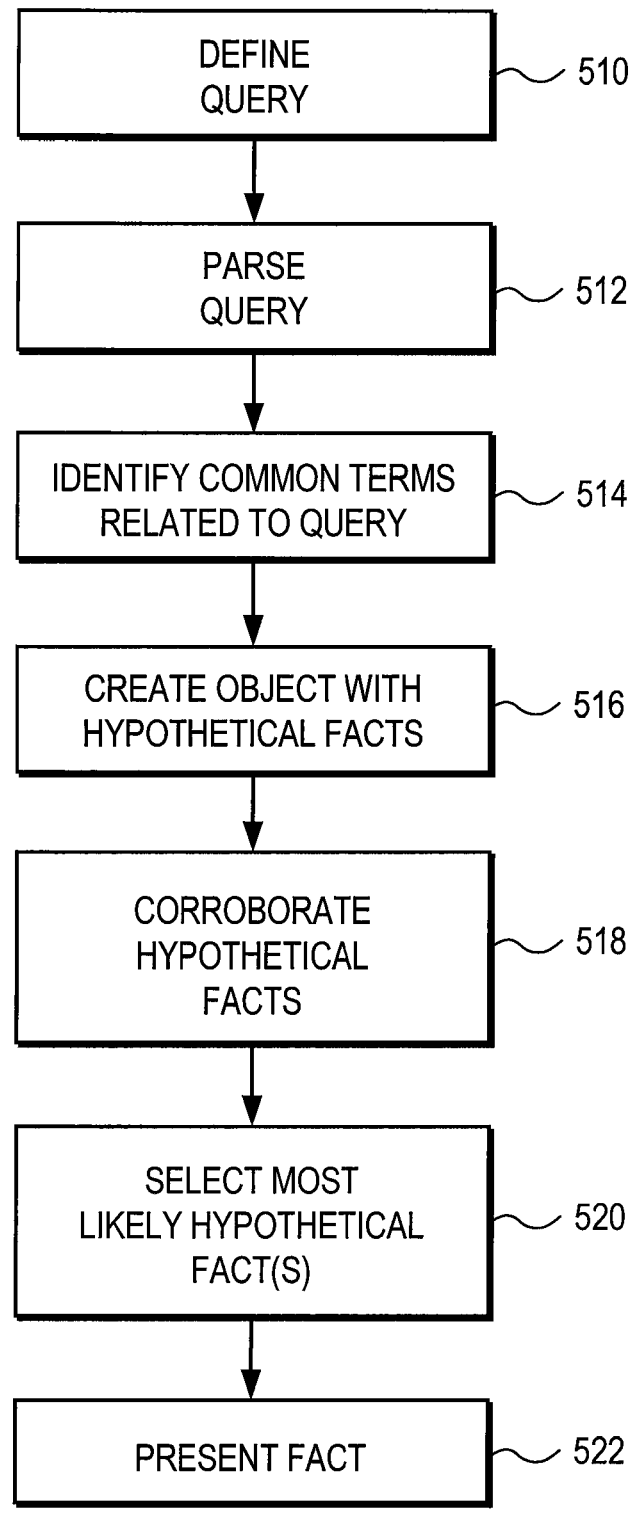
FIG. 5 is a flow chart illustrating steps performed by the corroboration module to present a likely correct fact.

FIG. 5 is a flow chart illustrating steps performed by the corroboration module 300 to present a likely correct fact according to one embodiment. Those of skill in the art will recognize that different embodiments can perform different and/or additional steps than the ones shown in FIG. 5. Likewise, the steps can be performed in different orders.

Initially, a query is defined 510. The query can be defined based on real-time user input, based on historical queries received by a search engine, or through other techniques. The query is parsed 512 to remove noise words, and to identify any objects, facts, or attributes in the repository 115 matching the remaining terms. In addition, the corroboration module 300 analyzes documents on the document hosts 102 to identify 514 common terms related to the query.

The corroboration module 300 creates 516 an object having real and hypothetical facts based on the identified objects, facts, and attributes and the common terms related to the query. These values of the hypothetical facts are expanded and corroborated 518 using electronic documents to identify facts that are most likely correct. As described above, in one embodiment a fact is most likely correct if it is not contained within another fact having at least the same number of supporting documents, and the number of supporting documents surpasses a threshold. The likely correct facts are presented 520, and one embodiment of the corroboration module 300 adds 522 the selected fact to the repository 115.

Figure 6:
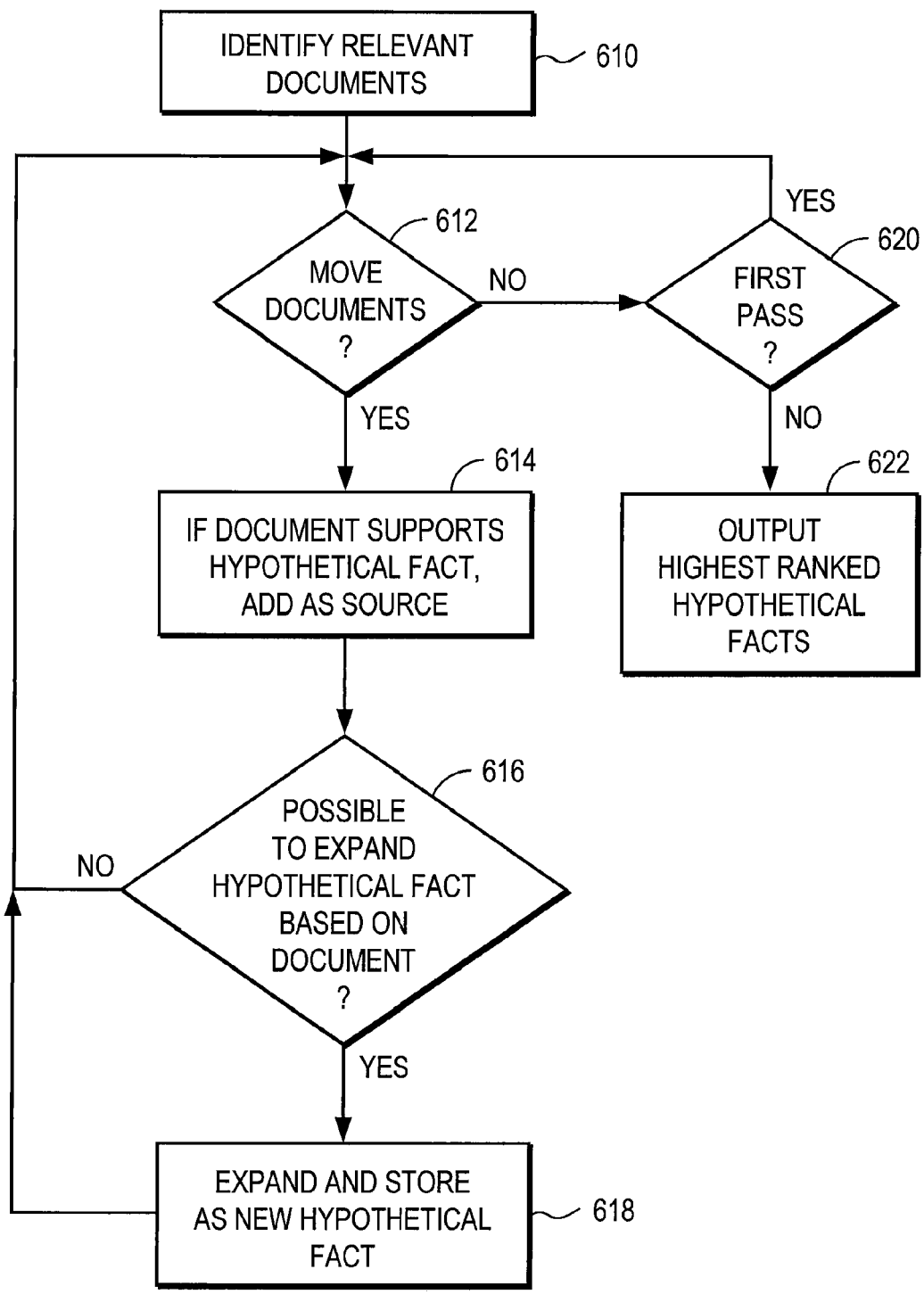
FIG. 6 is a flow chart illustrating steps performed by the hypothesis testing module according to one embodiment.

FIG. 6 is a flow chart illustrating steps performed by the hypothesis testing module 316 according to one embodiment.

The steps illustrated in FIG. 6 generally correspond to the "corroborate hypothetical facts" 518 step of FIG. 5, although can also be performed by other steps of FIG. 5. Those of skill in the art will recognize that different embodiments can perform different and/or additional steps than the ones shown in FIG. 6. Likewise, the steps can be performed in different orders.

The hypothesis testing module 316 receives an object containing one or more hypothetical facts. The module 316 searches the documents on the document hosts 102 to identify 610 documents such as web pages that are relevant to the object. For 612 each identified document, and for each hypothetical fact, the hypothesis testing module 316 determines whether the document under consideration mentions the attribute and the value of the fact. If a hypothetical fact is mentioned by a document, the module 316 adds the document to the list of sources for the fact (if it is not already listed). The hypothesis testing module 316 also determines 616 whether it is possible to expand the value of a fact based on contextual clues in the document. If the contextual clues permit the hypothesis testing module 316 to expand the value, the module creates 618 a new hypothetical fact having the expanded value (and the same attribute as the original fact on which it is based). This new, expanded, hypothetical fact is stored in the object and analyzed in the same manner as the other facts within the object.

In one embodiment, the hypothesis testing module 316 makes 620 two passes through the identified documents to ensure that each hypothetical fact generated in the first pass has the opportunity to be corroborated by each document. The hypothesis testing module 316 outputs 622 the highest-ranked hypothetical facts. In one embodiment, the highest ranking facts are those that have enough supporting documents to surpass a threshold, and are not contained within another fact having at least the same level of support.

In summary, an embodiment of the corroboration module 300 analyzes defined queries in view of corroborating documents to identify likely correct facts that answer the queries. These likely correct facts are saved in a repository 115 in one embodiment, from where they can be used to answer subsequent queries.

The above description is included to illustrate the operation of embodiments of the invention and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method for identifying facts described by electronic documents, comprising:

defining a query, the query posing a question having an answer formed of terms from the electronic documents;

creating one or more hypothetical facts in response to the query and the electronic documents, each hypothetical fact representing a possible answer to the query, wherein creating one or more hypothetical facts in response to the query comprises:

parsing the query to filter out noise words and produce filtered terms;

searching a repository of facts comprising attributes and values to identify attributes corresponding to the filtered terms;

searching the electronic documents to identify terms that frequently appear near the filtered terms; and forming one or more hypothetical facts responsive to the attributes corresponding to the filtered terms and the terms that frequently appear near the filtered terms in the electronic documents;

corroborating the one or more hypothetical facts using the electronic documents to identify a likely correct fact; and presenting the identified likely correct fact as the answer to the query.

2. The method of claim 1, wherein defining a query comprises:

receiving a real-time query from a user of a web site.

3. The method of claim 1, wherein defining a query comprises:

receiving a set of historical queries submitted by users of a web site; and defining the query based on at least one of the historical queries in the set.

4. The method of claim 1, wherein corroborating a hypothetical fact using the electronic documents comprises:

determining how many of the electronic documents support the hypothetical fact;

identifying the hypothetical fact as likely correct if an amount of support for the hypothetical fact surpasses a threshold.

5. The method of claim 4, wherein identifying the hypothetical fact as likely correct comprises:

identifying the hypothetical fact as likely correct if it is not contained within another hypothetical fact having at least a same amount of support.

6. The method of claim 1, wherein a hypothetical fact comprises a value having one or more original terms and wherein corroborating a hypothetical fact using the electronic documents comprises:

identifying an electronic document that mentions the one or more original terms of the hypothetical fact;

examining contextual clues in the electronic document to determine whether the hypothetical fact can be expanded to include one or more additional terms; and responsive to a positive determination that the hypothetical fact can be expanded, creating a new hypothetical fact having the original terms and the additional terms.

7. The method of claim 6, wherein the electronic document is described by a markup language having open and close tags and wherein examining contextual clues in the electronic document comprises:

identifying open and close tags surrounding the original terms in the electronic document; and identifying additional terms within the open and close tags surrounding the original terms in the electronic document.

8. The method of claim 1, wherein presenting the identified likely correct fact as the answer to the query comprises:

displaying the likely correct fact on a web page.

9. The method of claim 1, wherein presenting the identified likely correct fact as the answer to the query comprises:

storing the likely correct fact in a fact repository.

10. A system for identifying facts described by electronic documents, comprising:

one or more processors;
memory; and
one or more programs stored in the memory, the one or more programs comprising instructions to:

define a query, the query posing a question having an answer formed of terms from the electronic documents;

create one or more hypothetical facts in response to the query and the electronic documents, each hypothetical fact representing a possible answer to the query, wherein creating one or more hypothetical facts in response to the query comprises:

parsing the query to filter out noise words and produce filtered terms;

searching a repository of facts comprising attributes and values to identify attributes corresponding to the filtered terms;

searching the electronic documents to identify terms that frequently appear near the filtered terms; and forming one or more hypothetical facts responsive to the attributes corresponding to the filtered terms and the terms that frequently appear near the filtered terms in the electronic documents;

corroborate the one or more hypothetical facts using the electronic documents to identify a likely correct fact; and present the identified likely correct fact as the answer to the query.

11. The system of claim 10, wherein the instructions to define the query include instructions to receive a real-time query from a user of a web site.

12. The system of claim 10, wherein the instructions to define the query include instructions to receive a set of historical queries submitted by users of a web site and define the query based on at least one of the historical queries in the set.

13. The system of claim 10, wherein the instructions to corroborate the one or more hypothetical facts include instructions to:

determine how many of the electronic documents support the hypothetical fact;

identify the hypothetical fact as likely correct if an amount of support for the hypothetical fact surpasses a threshold.

14. The system of claim 13, wherein the instructions to identify the hypothetical fact as likely correct include instructions to identify the hypothetical fact as likely correct if it is not contained within another hypothetical fact having at least a same amount of support.

15. The system of claim 10, wherein a hypothetical fact comprises a value having one or more original terms and wherein the instructions to corroborate the one or more hypothetical facts include instructions to:

identify an electronic document that mentions the one or more original terms of the hypothetical fact; and examine contextual clues in the electronic document to determine whether the hypothetical fact can be expanded to include one or more additional terms, and, responsive to a positive determination that the hypothetical fact can be expanded, creating a new hypothetical fact having the original terms and the additional terms.

16. The system of claim 15, wherein the electronic document is described by a markup language having open and close tags and wherein the instructions to examine contextual clues in the electronic document include one or more additional terms include instructions to identify open and close tags surrounding the original terms in the electronic document, and identify additional terms within the open and close tags surrounding the original terms in the electronic document.

17. The system of claim 10, wherein the instructions to present the identified likely correct fact include instructions to display the likely correct fact on a web page.

18. The system of claim 10, wherein the instructions to present the identified likely correct fact include instructions to store the likely correct fact in a fact repository.

19. A non-transitory computer readable storage medium storing one or more programs configured for execution by a computer, the one or more programs comprising instructions for:

defining a query, the query posing a question having an answer formed of terms from the electronic documents;

creating one or more hypothetical facts in response to the query and the electronic documents, each hypothetical fact representing a possible answer to the query, wherein creating one or more hypothetical facts in response to the query comprises:

parsing the query to filter out noise words and produce filtered terms;

searching a repository of facts comprising attributes and values to identify attributes corresponding to the filtered terms;

searching the electronic documents to identify terms that frequently appear near the filtered terms; and forming one or more hypothetical facts responsive to the attributes corresponding to the filtered terms and the terms that frequently appear near the filtered terms in the electronic documents;

corroborating the one or more hypothetical facts using the electronic documents to identify a likely correct fact; and presenting the identified likely correct fact as the answer to the query.

20. The computer readable storage medium of claim 19, further comprising instructions for receiving a real-time query from a user of a web site.

21. The computer readable storage medium claim 19, further comprising instructions for receiving a set of historical queries submitted by users of a web site and defining the query based on at least one of the historical queries in the set.

22. The computer readable storage medium of claim 19, further comprising instructions for:

determining how many of the electronic documents support the hypothetical fact;

identifying the hypothetical fact as likely correct if an amount of support for the hypothetical fact surpasses a threshold.

23. The computer readable storage medium of claim 22, further comprising instructions for identifying the hypothetical fact as likely correct if it is not contained within another hypothetical fact having at least a same amount of support.

24. The computer readable storage medium of claim 19, wherein a hypothetical fact comprises a value having one or more original terms and wherein instructions for corroborating a hypothetical fact using the electronics documents further comprises instructions for:

identifying an electronic document that mentions the one or more original terms of the hypothetical fact; and examining contextual clues in the electronic document to determine whether the hypothetical fact can be expanded to include one or more additional terms, and, responsive to a positive determination that the hypothetical fact can be expanded, creating a new hypothetical fact having the original terms and the additional terms.

25. The computer readable storage medium of claim 24, wherein the electronic document is described by a markup language having open and close tags and wherein the fact expansion module is adapted to identify open and close tags surrounding the original terms in the electronic document, and identify additional terms within the open and close tags surrounding the original terms in the electronic document.

26. The computer readable storage medium of claim 19, further comprising instructions for displating the likely correct fact on a web page.

27. The computer readable storage medium of claim 19, further comprising instructions for storing the likely correct fact in a fact repository.

\* \* \* \* \*